United States Patent
Stanton

(10) Patent No.: US 7,246,191 B2
(45) Date of Patent: Jul. 17, 2007

(54) METHOD AND APPARATUS FOR MEMORY INTERFACE

(75) Inventor: Kevin B. Stanton, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 162 days.

(21) Appl. No.: 11/096,182

(22) Filed: Mar. 31, 2005

(65) Prior Publication Data

US 2006/0230210 A1    Oct. 12, 2006

(51) Int. Cl.
*G06F 5/00* (2006.01)
*G06F 13/36* (2006.01)

(52) U.S. Cl. .......................... 710/310; 710/52; 710/56; 710/306

(58) Field of Classification Search ................ 710/310, 710/52, 56, 306
See application file for complete search history.

(56) References Cited

U.S. PATENT DOCUMENTS

| | | | |
|---|---|---|---|
| 2004/0205270 A1 | 10/2004 | Creta et al. | |
| 2004/0233933 A1 | 11/2004 | Munguia | |
| 2004/0268015 A1 | 12/2004 | Pettey et al. | |
| 2005/0012747 A1 | 1/2005 | Sauber | |
| 2005/0038947 A1 | 2/2005 | Lueck et al. | |
| 2005/0068956 A1* | 3/2005 | Liao et al. | 370/395.1 |
| 2005/0285863 A1* | 12/2005 | Diamond | 345/519 |

OTHER PUBLICATIONS

Intel IXP1200 Network Processor Family: Hardware Reference Manual, Dec. 2001; pp. 18-19, 268-272.*
Microsoft Computer Dictionary: Fifth Edition, 2002; Definitions of 'atomic transaction' and 'burst'.*

* cited by examiner

*Primary Examiner*—Mark H. Rinehart
*Assistant Examiner*—Jeremy S. Cerullo

(57) ABSTRACT

A bridge mechanism enables efficient communication between first and second devices, e.g., processors, via an interface, such as PCI express.

24 Claims, 11 Drawing Sheets

METHOD AND APPARATUS FOR MEMORY INTERFACE

CROSS REFERENCE TO RELATED APPLICATIONS

Not Applicable.

STATEMENT REGARDING FEDERALLY SPONSORED RESEARCH

Not Applicable.

BACKGROUND

As is known in the art, many systems include multiple processors that need to communicate efficiently. Packet-processing devices, for example, can include network processors and other processor types. Network processors can be used to pass data traffic to various networks over different network interfaces. In general, network processors are optimized to process packets at high speeds. Network processors typically include multiple programmable packet-processing engines or elements running in parallel with mechanisms for the processing engines to communicate with each other. Network processors can include a general purpose microprocessor to handle control tasks and memory controllers to facilitate movement of packets in and out of external memory. Network processors can further include interface modules for one or more standardized interfaces. Additional network processor modules can include coprocessors for accelerating various functions, such as encryption and decryption. Some network processors, such as the IXP family of network processors by Intel Corporation, have multiple cores on a single die. Communication between the cores is accomplished through hardware-supported queuing mechanisms implemented in the memory controller(s).

In certain applications, it is desirable for a network processor, for example, to have high-speed communication with a processor having an architecture different from the network processor. Existing inter-processor connections schemes have limited bandwidth. For example, PCI (Peripheral Component Interconnect) can be used to enable communication between processing elements in a network processor, such as an Intel IXP 2800 network processor, and another processor type, such as an Intel Pentium™ processor. However, this arrangement provides limited bandwidth, such as less than 1Gbps (bit per second) for 128 byte transfers.

BRIEF DESCRIPTION OF THE DRAWINGS

The exemplary embodiments contained herein will be more fully understood from the following detailed description taken in conjunction with the accompanying drawings, in which.

DETAILED DESCRIPTION

The exemplary embodiments described herein provide a bridge mechanism enabling relatively high-speed data exchange between a first device, such as a first processor, and a second device, such as a second processor. The bridge mechanism is well-suited for providing inter-processor communication where the first processor has a first architecture and the second processor has a second architecture that is different than the first architecture. While the illustrated embodiments are shown having an Intel Pentium™ processor communicate via a PCI Express architecture to an Intel IXP family processor, it is understood that the exemplary embodiment are applicable to processors having the same or different architectures, devices other than processors, and interface architectures other than PCI Express.

Figure 1:
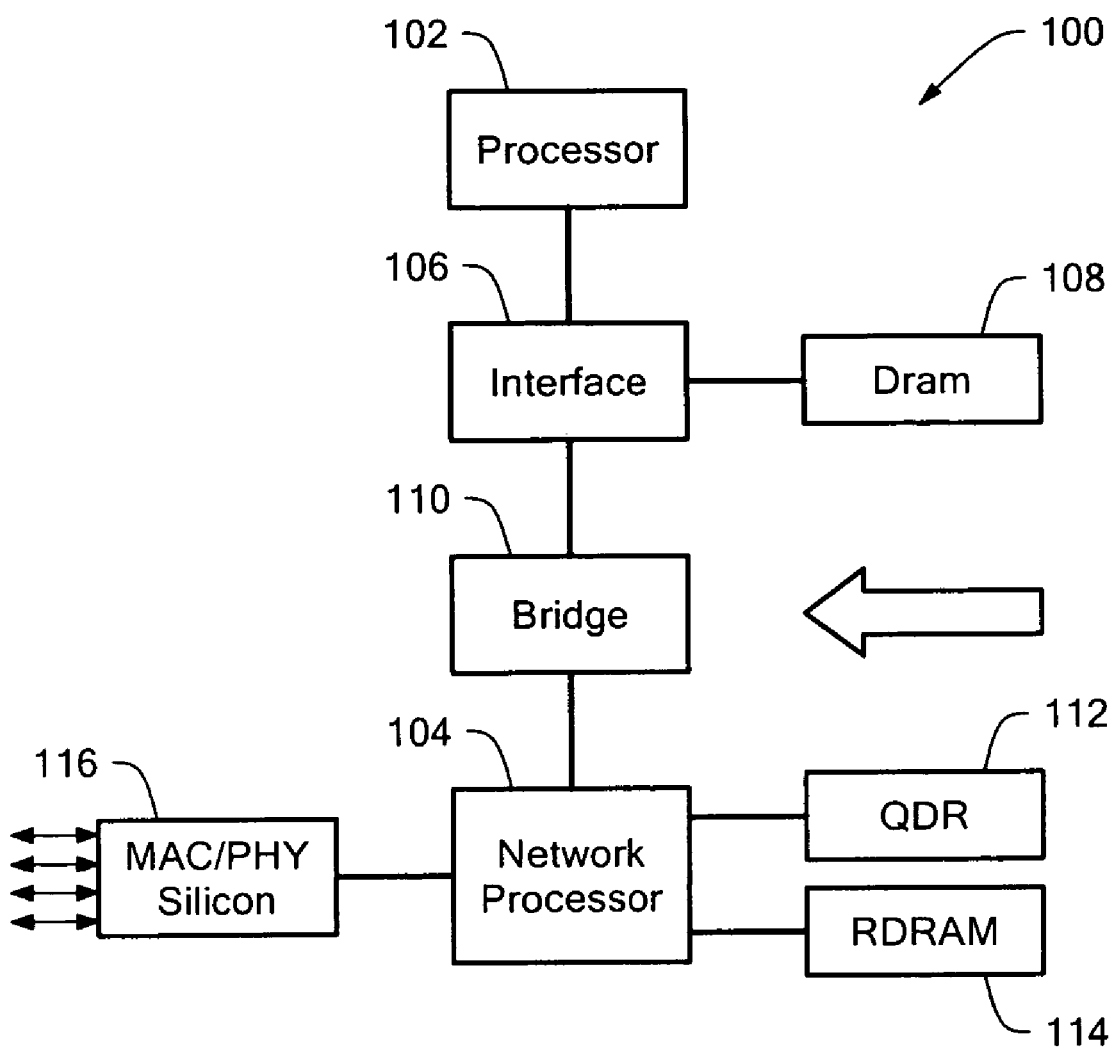
FIG. 1 is a schematic representation of a system having a bridge mechanism.

FIG. 1 shows an exemplary system 100 having a first processor 102 exchanging information with a second processor 104. In one particular embodiment, the first processor 102 is provided as a Pentium™ processor made by Intel Corporation, and the second processor 104 is provided as a IXP 2800 network processor made by Intel. It is understood, however, that the exemplary embodiments shown and described herein are applicable to a variety of processors.

The first processor 102 is coupled to an interface 106, which can be provided by a PCI (Peripheral Component Interconnect) Express chipset, such as the Intel E7520 Chipset. As is well known, PCI Express is a Load/Store architecture built to be software compatible with PCI but with reduced pin count and increased bandwidth up to 128 Gbps. PCI Express implements memory reads and writes by sending messages called Transport Layer Packets (TLPs) over high-speed serial links operating at 2.5 GBaud which, after encoding, carry headers and payload at up to 2 Gbps per lane. Switches (instead of busses and bridges) move packets from the transmitter to the intended recipient. A PCI Express Write TLP contains, among other things, the destination address, byte enables, length in the header, and the actual data that is to be written in the payload of the TLP. CRC(s) (Cyclic Redundancy Codes) at the end of the TLP allows the receiver to detect data corruption. The TLP is serialized and sent across the high-speed serial link. Reads are performed by first sending a read "request" TLP (header only-no data) to the destination containing, among other things, the desired start address of the read data, and the length. Upon receipt of the request, the receiver packetizes the appropriate amount of requested data and returns the data in one or more completion TLPs. The completion TLPs contain the same "tag" in its header as was in the request TLP, allowing the original request by the requester to associate the completion with a request. A PCI Express Lane consists of two differential pairs—one for Rx and one for Tx. Multiple lanes can be aggregated into one logical link. A x4 link, for example, contains four Lanes over which the bytes of a TLP are striped. PCI Express implements "Reliable Transport" in hardware by regularly exchanging Data Link Layer Packets (DLLPs) between link partners. Sequence numbers together with ACK (acknowledge) and NAK (no acknowledge) packets allow retransmission at the link level if a packet is found to be missing or corrupted. DLLPs also advertise Rx credits to ensure that ingress First In/First Out (FIFO) devices (there are several—one per type of TLP) do not overflow.

A first memory 108 such as DRAM (Dynamic Random Access Memory) can be coupled to the first processor 102 via the interface 106. It is understood that a wide range of memory types can be coupled to the first processor 102.

A bridge mechanism 110 is coupled between the interface 106 and the second processor 104. In an exemplary embodiment, the bridge mechanism 110 is coupled to a memory port, such as a QDR (Quad Data Rate) SRAM (Static Random Access Memory) port, of the second processor 104. The bridge mechanism 110 can be attached to one or more of the QDR SRAM ports of the second processor 104 as if the bridge mechanism was a TCAM (Ternary Content Adressable Memory) or other LA-1 (Look-Aside) slave co-processor. LA-1 (or LA1) defines an interface for devices located adjacent to a network processor for offloading tasks from the network processor. The LA-1 Interface is based on a separate I/O DDR (double data rate) SRAM style interface. The LA-1 interface is set forth in detail in the NPF (Network Processing Forum) Look-Aside (LA-1) Interface Implementation Agreement, Revision 1.1, Apr. 15, 2004, available from the NPF website at www.npforum.org. As will be readily apparent in the fuller description below, the bridge mechanism provides a master-slave interface over a slave-only interface. That is, the QDR SRAM port is a 'slave-only' interface that is used to provide a master-slave interface in exemplary embodiments described herein.

It is understood that LA-1 is one exemplary interface and that a variety of other interfaces are contemplated for the bridge mechanism. It should be noted that certain modifications can be made to the LA-1 interface to accommodate various device characteristics without departing from the exemplary embodiments contained herein. It is further understood that a variety of interfaces, including modified standard interfaces can be used for communication between the bridge 110 and the second processor 104.

In general, when the second processor 104 issues an SRAM read to the QDR port coupled to the bridge mechanism 110, the read is recognized by the bridge mechanism, which returns the data that is referenced by the read. It is understood that a processing element (PE) in the second processor 104, can generate the read. When the second processor 104 issues an SRAM write, the write is recognized by the bridge mechanism 110 and stores the write data in the appropriate location. Burst reads and burst writes are seen by the bridge mechanism 110 as sequences of individual 32-bit, for example, reads and writes from/to incrementing addresses.

QDR SRAM memory 112 and RDRAM (Rambus DRAM) 114 can be coupled to the second processor 104, which can be coupled to a MAC/PHY (Media Access Control)/(Physical Layer Device) 116 in a manner well known in the art.

The bridge mechanism 110 supports various commands to effect receive and transmit operations including transmit and receive TLP (Transport Layer Packet) operations. Transmit operations make use of the following bridge features: transmit (TX) buffer freelist, TX buffers (e.g., 64 Bytes each), and transmit send. Receive operations make use of the following bridge features: receive (RX) get queue, and receive buffers (e.g., 64 Bytes each).

Figure 2:
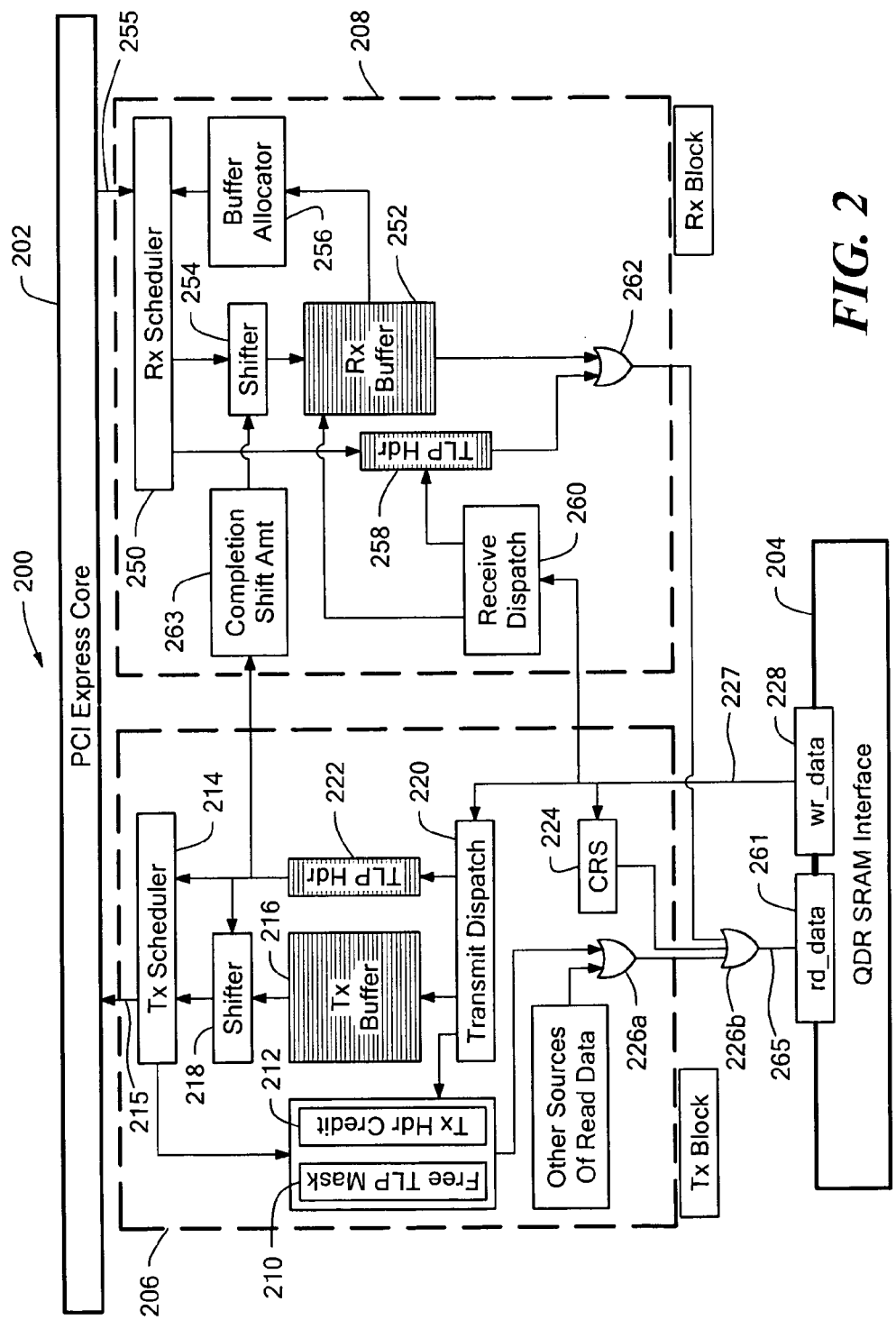
FIG. 2 is a schematic depiction showing a bridge mechanism.

FIG. 2 shows an exemplary architecture for an interprocessor bridge mechanism 200. The bridge mechanism 200 is coupled between a PCI-Express core 202, which interfaces to a processor, and a memory interface 204, such as a QDR SRAM interface of a network processor. The bridge mechanism 200 includes a transmit portion 206 and a receive portion 208.

The transmit portion 206 includes a free TLP mask 210 and a transmit header credit module 212 coupled to a transmit scheduler 214, which is connected to the PCI-Express interface 202 via output port 215. A transmit buffer 216 for storing transmit data is coupled to the transmit scheduler 214 via a shifter 218 and to a transmit dispatch module 220. A TLP header module 222 is coupled at one end to the transmit dispatch module 220 and at the other end to the transmit scheduler 214, the shifter 218, and the receive module 208. A control and status register (CSR) module 224 can contain status information about and control information for the receive and transmit operations. Glue logic, such as logical OR gates 226a, b ties the circuit together. Data enters the transmit portion 206 at an input port 227 via a write data port 228 of the QDR SRAM interface 204.

The receive portion 208 includes a receive scheduler 250 coupled to a receive buffer 252 via a shifter 254 and to the PCI-Express interface 202 via an input port 255. A buffer allocator 256 is coupled to the receive scheduler 250 and to the receive buffer 252. A TLP header module 258 is coupled to the receive scheduler 250 and to a read data port 261 at output port 265 via glue logic shown as logical OR gates 262, 226b. A completion shift amt 263, which stores/provides the requested byte alignment of data that is returned in one or more completions as a response to a previously transmitted read request, is coupled to the receive shifter 254 and to the transmit portion 206. A receive dispatch module 260 interacts with the write port 228 and the TLP header module 258 and receive buffer 252.

The various storage modules, such as TLP header 222, and the like can be provided as various types of storage mechanisms that will be readily apparent to one of ordinary skill in the art. In one embodiment, FIFO (First In/First Out) devices are used.

FIG. 2A-2H show an exemplary operational sequence of receive and transmit of data through the bridge 200. In a transmit operation, a DMA (Direct Memory Access) is made by a processing element in a network processor, for example, to move N bytes from a local DRAM address X to PCI Express address Y.

Figure 2A:
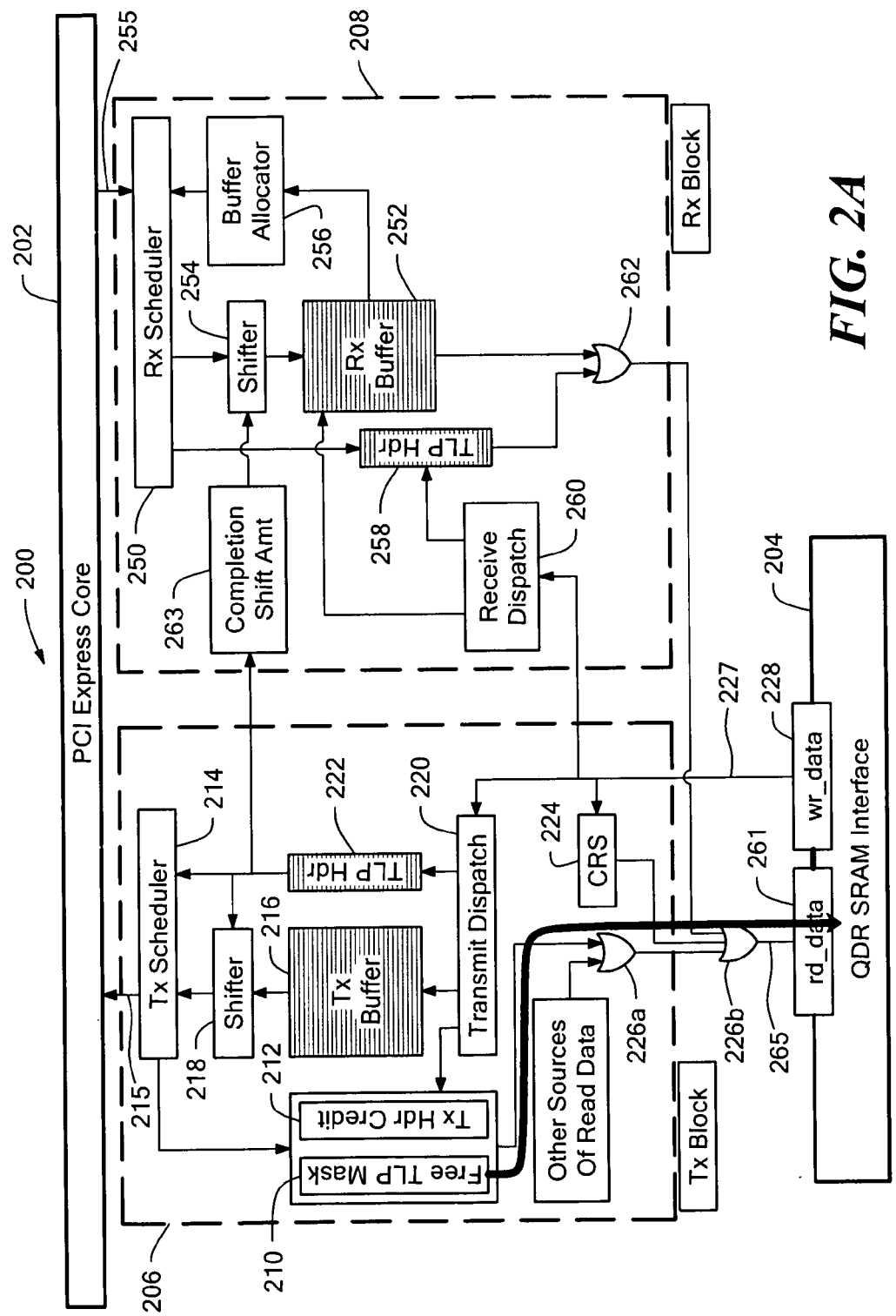
FIGS. 2A-2D show an exemplary data transmit sequence for a bridge mechanism.
Figure 2B:
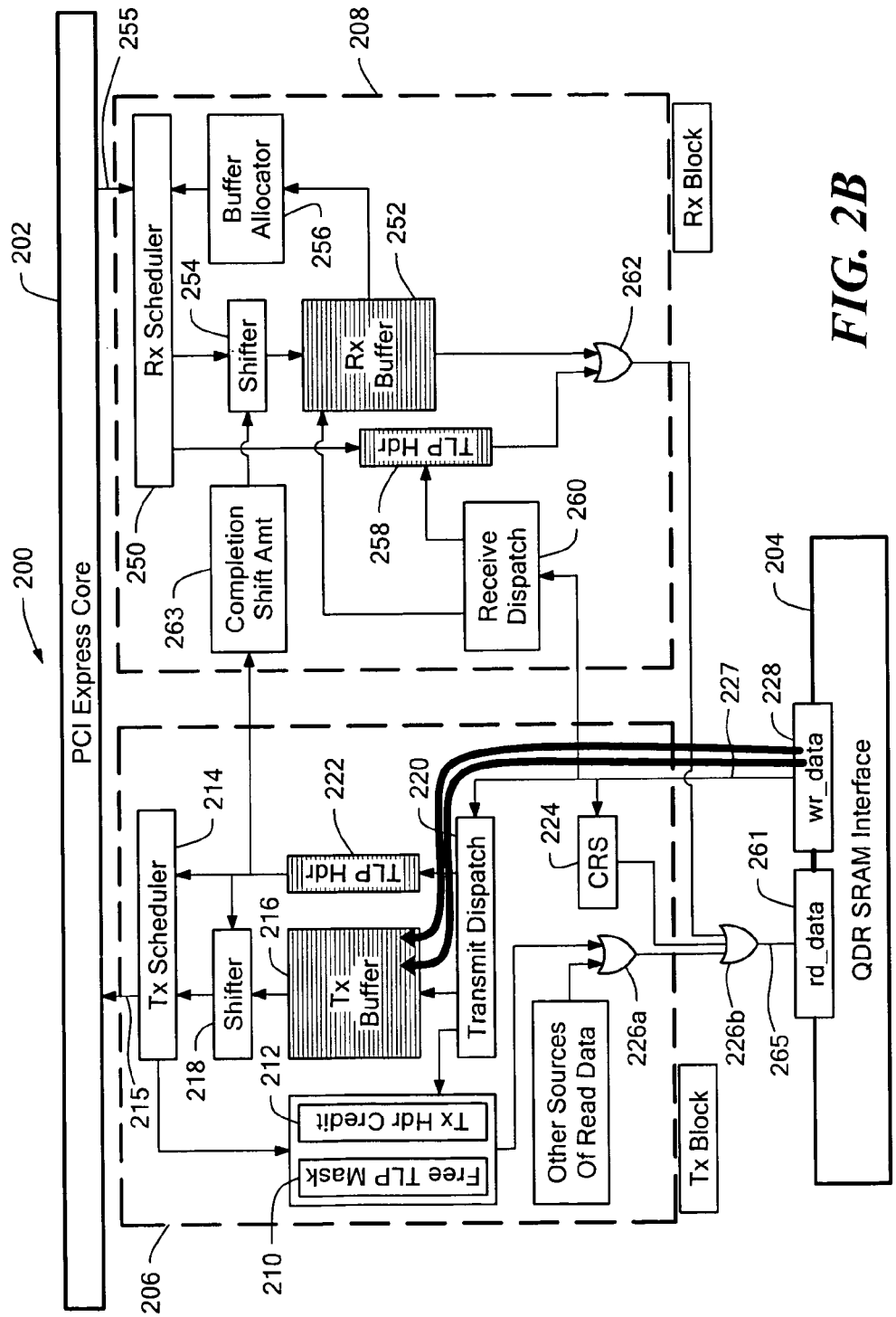

As shown in FIG. 2A, the processing element first reads via the read data port 261 the transmit buffer freelist 210, which can be provided as a bitmask indicating buffer availability, to secure ownership of buffers in the transmit buffer 216. If a bit in the transmit buffer bitmask 210 is set, the associated transmit buffer is now associated with the requesting processing element. The processing element then reads data, e.g., 64 bytes, from DRAM address X (e.g., DRAM 114 in FIG. 1) and writes packet payload to one of the now-allocated transmit buffers, as shown in FIG. 2B, by issuing an SRAM burst write to the appropriate memory-mapped buffer location in the bridge 200. Subsequent blocks of 64 bytes are written to other owned transmit buffers 216 until the complete payload for a PCI Express TLP packet is contained in a set of transmit buffers 216 in the bridge 200. A TLP is shown contained in two buffers as indicated by two arrows.

Figure 2C:
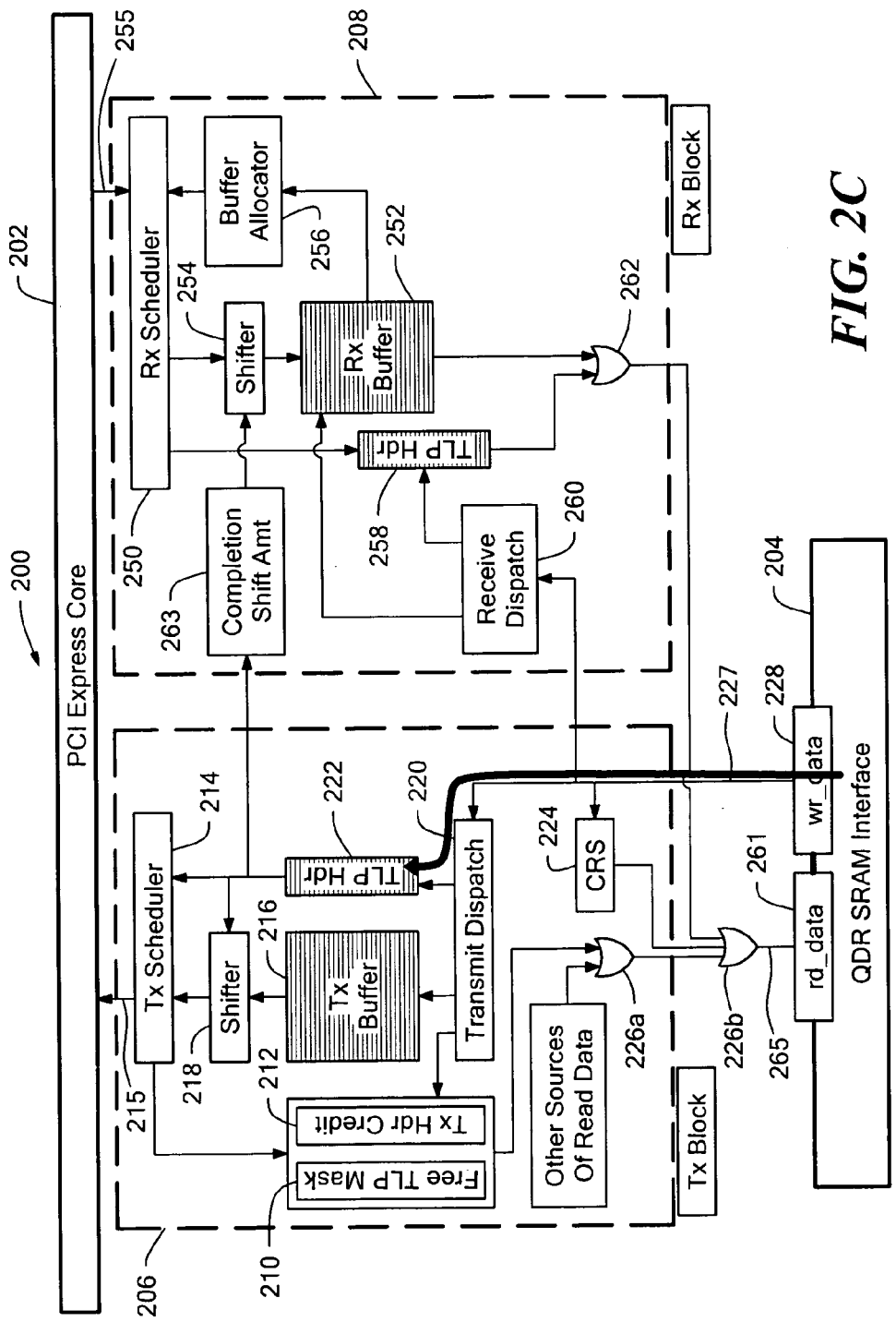

As shown in FIG. 2C, after the payload data is written to buffers 216, a record containing a PCI Express TLP header, an ordered list of transmit buffer indices, a shift amount, and possibly other fields, is created by the processing element in the network processor (e.g., 104 in FIG. 1) and is written to the Transmit Send CSR, causing it to be stored in the TLP hdr module (222), and enqueueing it for transmission.

Figure 2D:
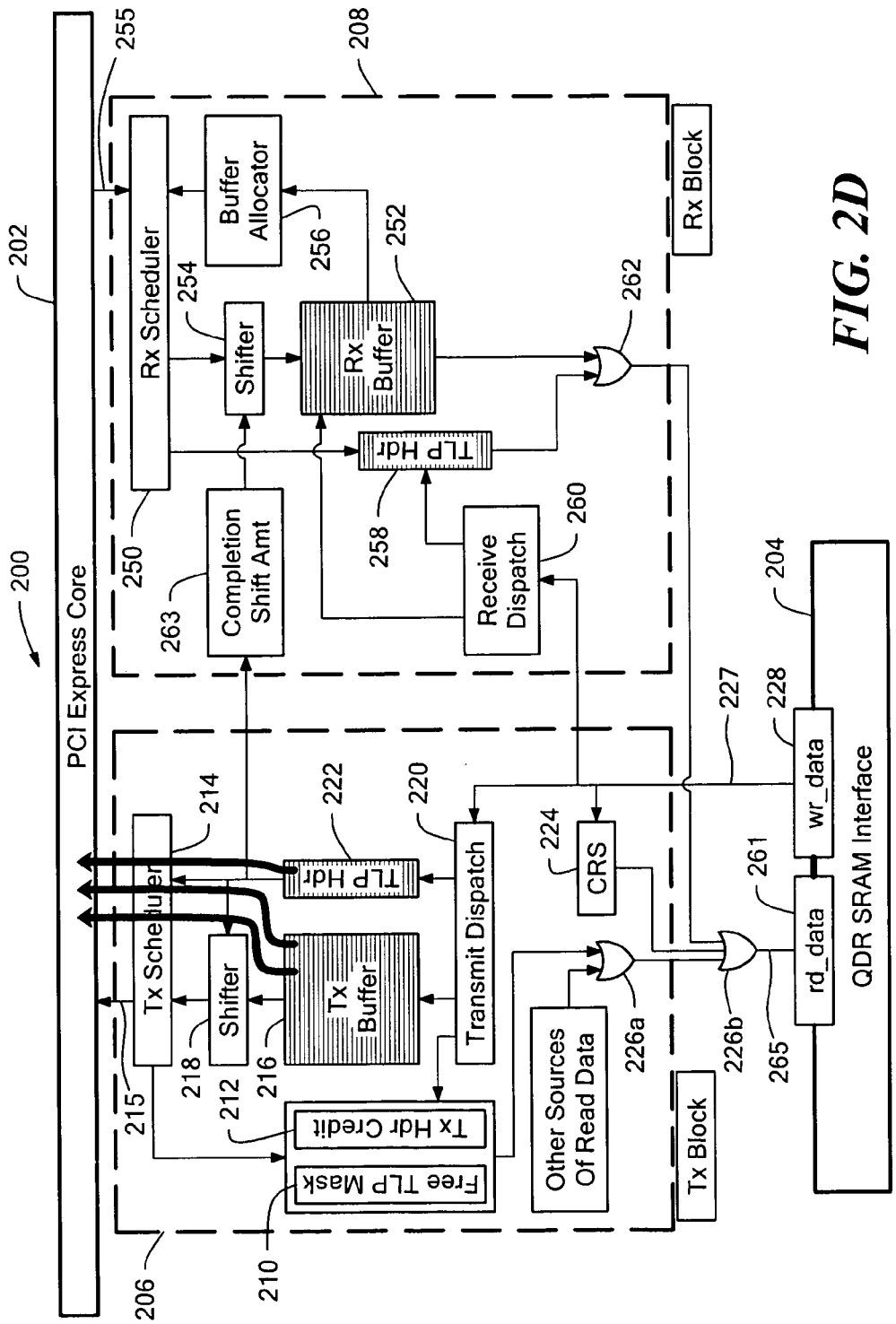

Automatically, as the PCI Express Core 202 indicates that it is ready to accept another TLP, the TLP header data is pulled from the TLP header module 222 and the payload is read from the two (in the illustrated embodiment) buffers 216 as shown in FIG. 2D. The TLP header and payload data are concatenated and sent to the PCI Express interface. The bit location of the transmit buffer freelist 210 corresponding to the now-free transmit buffers is again set to a logical '1', indicating that the buffer can again be written to by the processing element. This process continues until the DMA request is completed. While the illustration employs two transmit buffers 216 for the payload, fewer or more buffers can be used, including zero buffers if no payload is required.

Figure 2E:
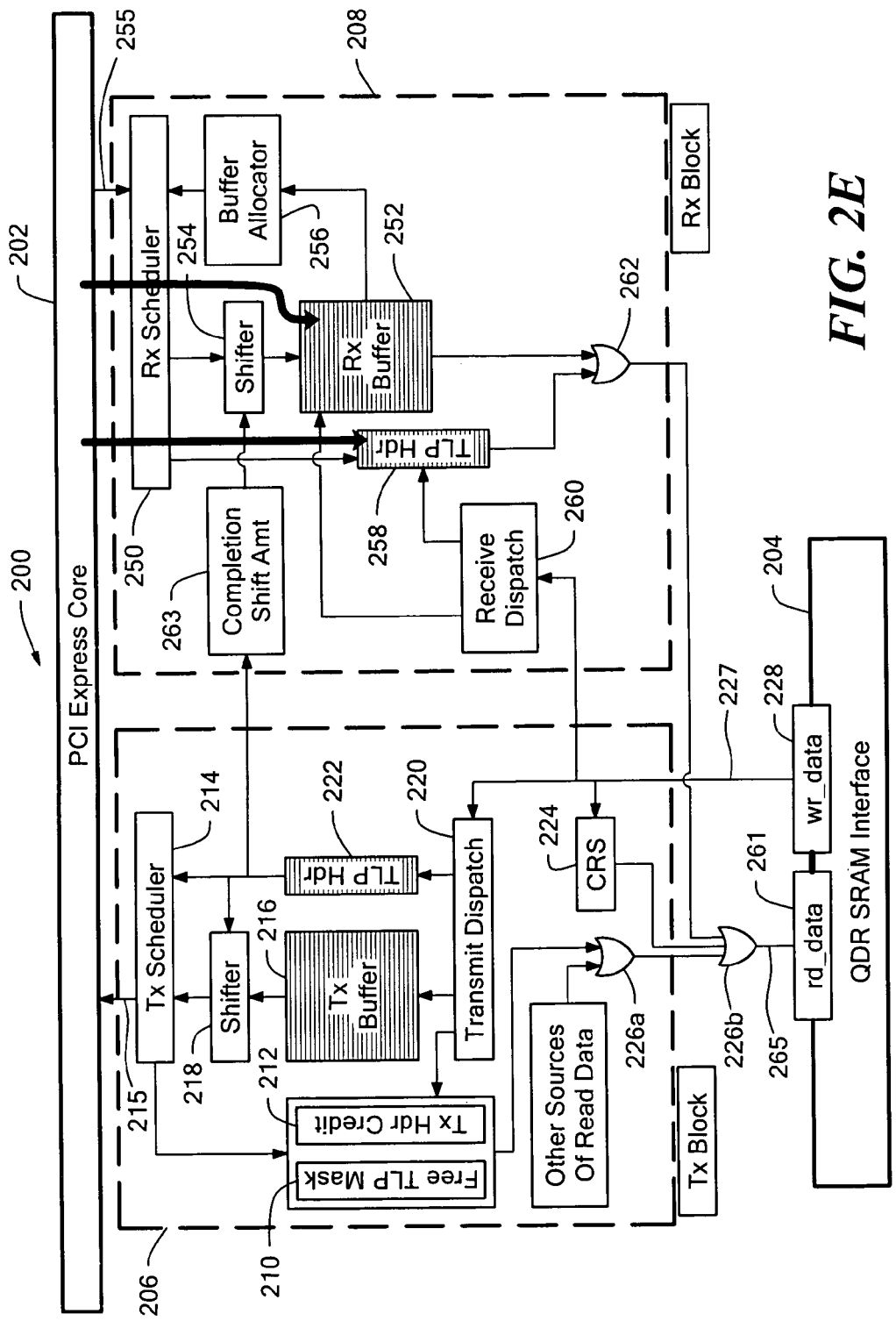
FIGS. 2E-2H show an exemplary data receive sequence for a bridge mechanism.

An exemplary bridge receive operation is illustrated in FIGS. 2E-2H. As shown in FIG. 2E, when a PCI Express TLP is received from its link partner, the bridge 200 stores the TLP payload (if any) in receive buffer(s) assigned by the buffer allocator 256. The illustrated embodiment shows one allocated buffer. The associated header, along with a list of buffer indices, is stored in the receive TLP header module 258.

In one particular embodiment, head and tail pointers are used by the TLP header module 258 to control data ingress and egress from the buffer 252. The tail pointer is incremented at once with the length of the enqueued TLP header and buffer list. This continues for every received TLP as long as there is space in the buffer 252. In one embodiment, the buffer 252 is composed of a number of independent fixed-sized buffers each of which can be referenced using an index. If there is no more room in the buffer 252, backpressure signals are generated to cause the link partner to stall waiting for credits in a manner well known in the art. It will be appreciated that a variety of mechanisms other than head and tail pointers can be used to control the buffer.

Figure 2F:
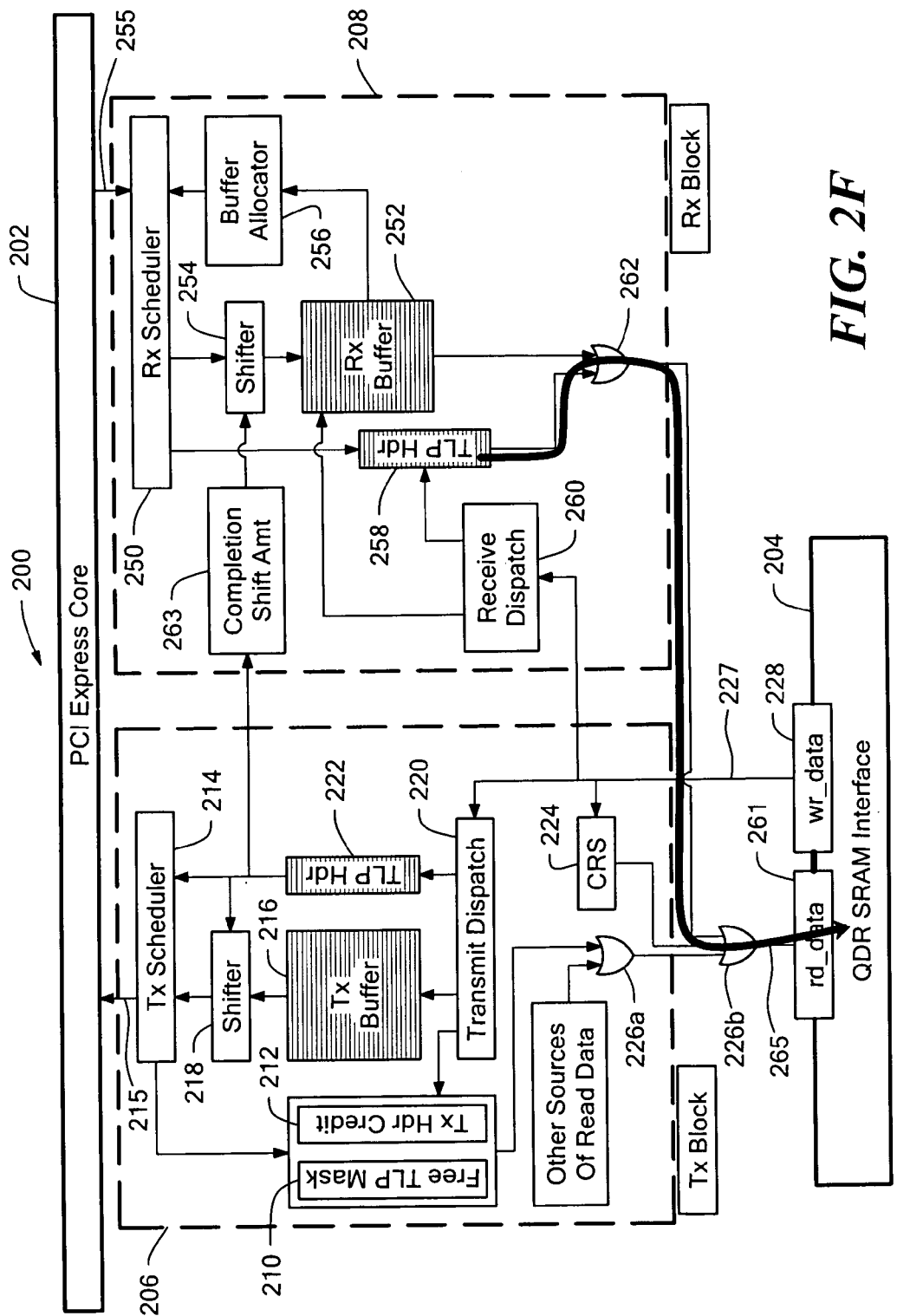
Figure 2G:
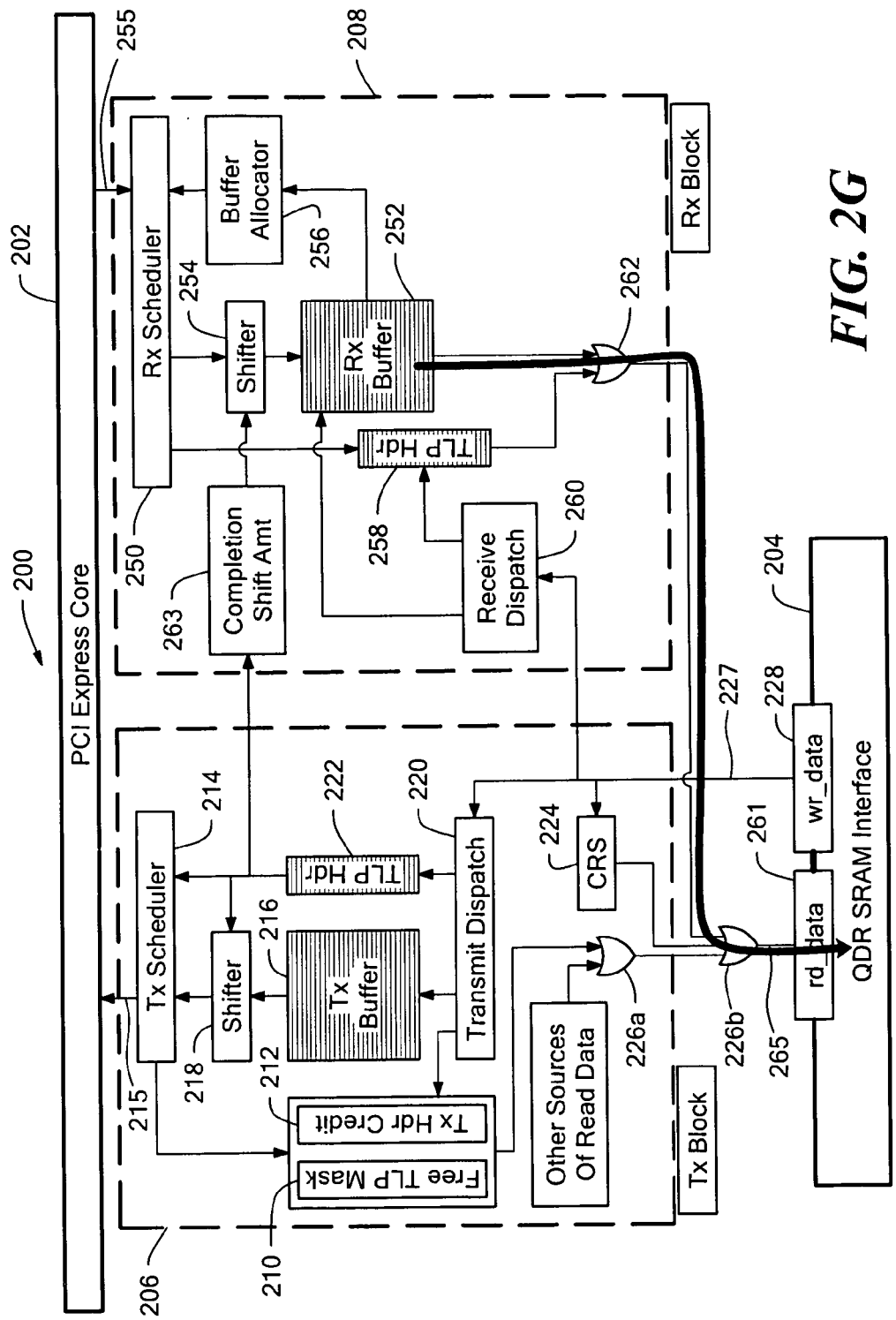

As shown in FIG. 2F, the processing element occasionally performs a speculative read from the TLP header 258 by issuing a read burst command to the appropriate SRAM address. The period between speculative reads may be adjusted to optimize for performance (smaller period) or optimize for low bus bandwidth/low power (larger period). Additionally, the period may be changed dynamically (for example, decreased at times of high traffic). If a 'header valid' bit is set in the data returned from TLP header module 258, the returned data contains a received TLP and buffer indices. The processing element then parses the header to determine whether it is an incoming read request, read completion, write request, etc. If it is a read completion, an internal processing element state in the processing element identifies where the payload data is to be stored. If it is an incoming write request, the header indicates the destination address. The processing element then reads the indicated receive buffer(s) 252, each in a single read burst, and writes the payload to the appropriate local DRAM address, as shown in FIG. 2G. In an exemplary embodiment, TLP payload data is read by the processing element one buffer at a time (one buffer equals one maximum-length PE read burst in length).

Figure 2H:
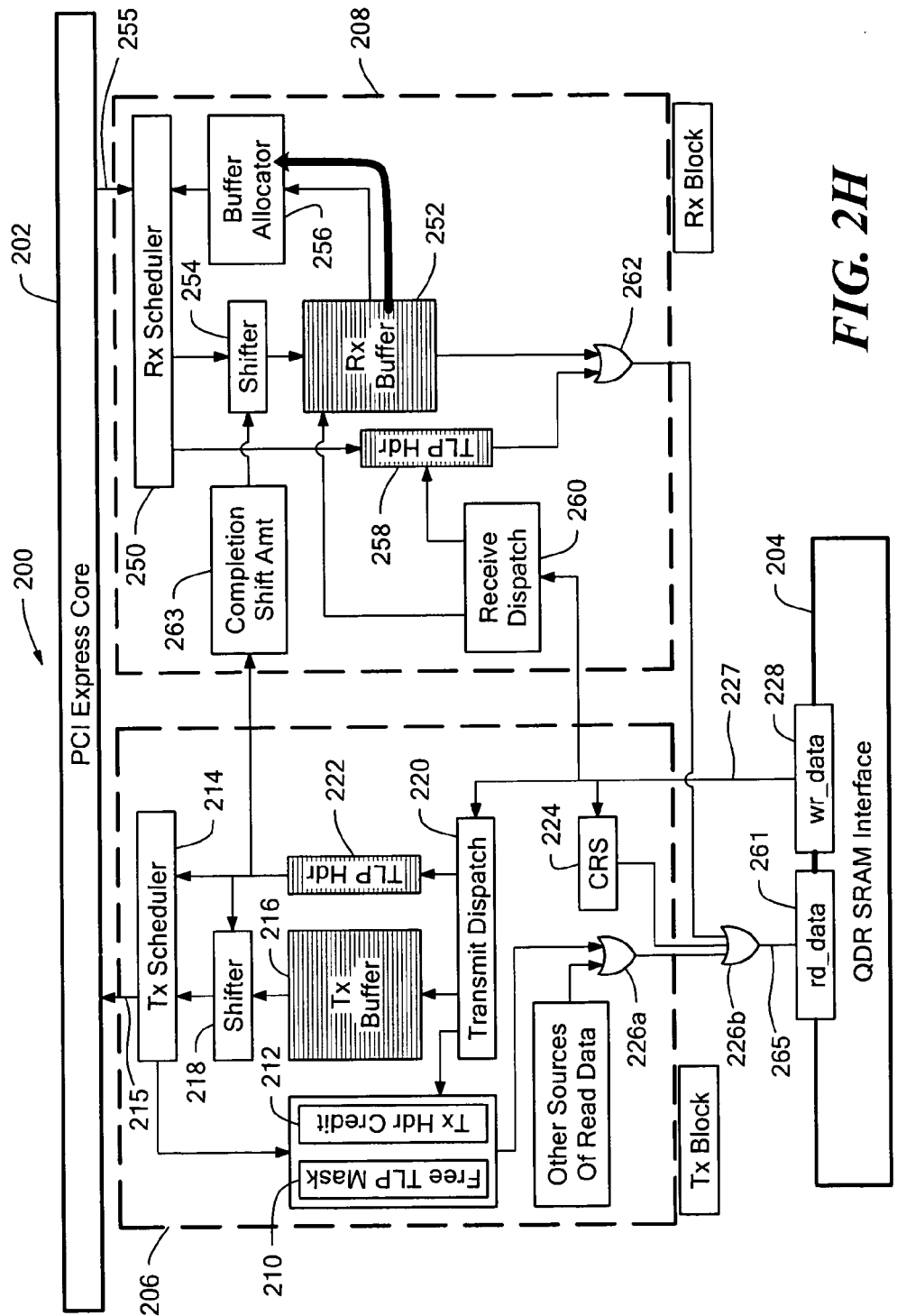

As shown in FIG. 2H, the bridge 200 automatically adds the receive buffer index Y to a receive buffer freelist in the buffer allocator 256 whenever a read address targets a receive buffer which has an index that is different from Y and the previous receive buffer that was read was the buffer with index Y. Since the processing element can read a full receive buffer (e.g., 64 Bytes) with a single burst, and since the memory (QDR) controller in the processing element guarantees that a burst will be seen without interruption or interleaving on the QDR bus pins, this method allows high performance implicit buffer freeing.

It is understood that the exemplary bridge mechanism embodiments can be implemented in a variety of hardware and software configurations. In one particular embodiment, the bridge is implemented in a programmable device, such as a Field Programmable Gate Array (FPGA).

While the exemplary embodiments contained herein, shown inter-processor communication between processors having different architectures, it is understood that the bridge can be used for processors having the same architecture. It is understood that other embodiments are contemplated in which the bridge can be used to enable communication between a processor and another load/store device over a given interface, such as a PCI Express device. Other exemplary interfaces include ASI (advanced switching), fibre-channel, infiniband, rapid 10, Ethernet, etc. These interfaces may be a network processor MSF (Media Switch Fabric) interface over System Parallel Interface Level 3/4 (SPI-3/SPI-4) or CSIX (Common Switch Interface). In addition, other embodiments are contemplated in which the bridge mechanism forms a part of a device, e.g., a network processor includes an integrated bridge mechanism.

Figure 3:
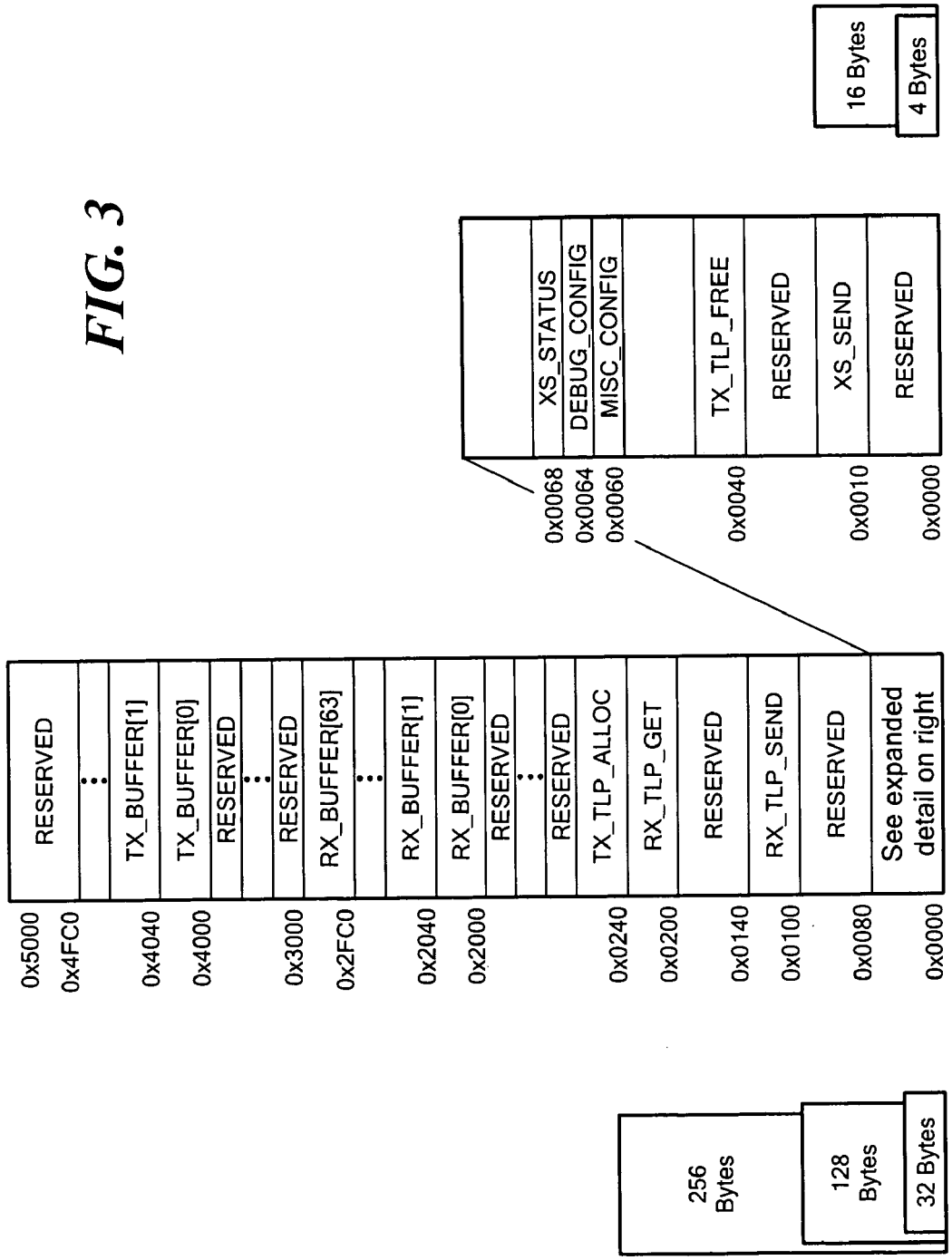
FIG. 3 is pictorial representation of an exemplary bridge mechanism address map.

FIG. 3 shows an exemplary address map for the bridge mechanism. The items discussed above in FIG. 2 have a mapped address to enable the network processor to access the items via the memory port. For example, receive buffers (252 in FIG. 2) are shown from address 0x2000 to 0x2FFF, with each buffer being 64 bytes in length.

Table 1 below shows an exemplary Configuration and Status Register (CSR) (224 FIG. 2) summary. Each CSR register has a specified address, length, function, and is read only (RO), write only (WO) or read/write (RW). XScale™ refers to a general purpose processor in an Intel IXP network processor.

TABLE 1

CSR summary

| Register Name | Byte Addr | CSR Length (Bytes) | Comment | Read/Write |
|---|---|---|---|---|
| TX_TLP_ALLOC | 0x0240 | 16 (+16 rsrvd) | Reading this CSR returns credits which give the right to write to Tx buffers and TLP headers. | RO |
| TX_TLP_FREE | 0x0040 | 16 (+16 rsrvd) | Tx Buffers and header credits allocated by the TX_TLP_ALLOC mechanism may be returned using this mechanism if they are no longer needed. This is useful for debug purposes | WO |
| TX_TLP_SEND | 0x0100 | 64 | Writing a special TLP-header-like record to this CSR causes a TLP to be scheduled for transmission. | WO |

TABLE 1-continued

CSR summary

| Register Name | Byte Addr | CSR Length (Bytes) | Comment | Read/Write |
|---|---|---|---|---|
| RX_TLP_GET | 0x0200 | 64 | Burst-read is required. Returns the PCI Express header and indices of receive-buffers where payload data is stored (for TLPs that include payload data). | RO |
| TX_BUFFER[n] | 0x4000 | 4096 (+4096 rsrvd) | These buffers store TLP payload data before the TLP header is enqueued with the TX_TLP_SEND CSR. Each buffer is 64 Bytes in length. There are no restrictions on the order of the writes or on the length or number of the bursts. These buffers are allocated through the TX_TLP_ALLOC mechanism and are automatically freed when their contents have been transmitted. | WO |
| RX_BUFFER[n] | 0x2000 | 4096 | These buffers stores TLP payload data after it has been received from PCI Express by Megler. Each buffer is 64 Bytes in length. The contents of a buffer can be read with at most one burst. The buffer is added to the free list immediately after the first burst read ends. | RO |
| XS_STATUS | 0x0068 | 4 | This register is used by the XScale to determine whether or not it is permitted to send a TLP using the XS_SEND interface. This CSR also contains error and other TBD status bits from Megler. | RO |
| XS_SEND | 0x0068 | 20 | TLP Headers are written here by the XScale. Since write bursts are not possible from the XScale, this register is dedicated to the XScale, eliminating the possibility of concurrent access. | WO |
| DEBUG_CONFIG | 0x0064 | 4 | Used to configure miscellaneous debug features of Megler. | RW |
| MISC_CONFIG | 0x0060 | 4 | This CSR is used for miscellaneous configurations of Megler such as entering loopback mode. | RW |

The exemplary embodiments shown and described herein enable a user to efficiently implement an initiator/target type interface (e.g., PCI Express) over a target-only type interface (e.g., QDR SRAM). One of ordinary skill in the art will appreciate that achieving functionality provided by the bridge mechanism over a media interface, e.g., SPI-4 (System Parallel Interface Level 4), is significantly more complex since the SPI is more complex than a memory interface, and integration of PCI Express Read/Write/DMA commands into existing network traffic software in the IXP is more complex than the simple SRAM read/write command that can be issued to the QDR-SRAM-attached bridge from any processing element.

In an exemplary embodiment, the second processor, illustrated in FIG. 1 as the network processor, should guarantee that a write burst is not broken up between its issue and when the command arrives on the QDR SRAM bus pins. This allows simplification of the bridge such that multiple processing elements can write a multi-DWord (double word) quantity to the transmit send CSR without fear of having them interleaved except at the boundaries of the burst. It is understood that a dword refers to a unit of information comprised of 32 bits or 4 bytes or 2 words.

Similarly for read bursts, since, in illustrative embodiments, a burst read can atomically read up to 64 Bytes of data, for example, and since each receive buffer has a size of 64 Bytes, one can implicitly free a receive buffer when the end of a burst read is observed by noticing that the read address is now within the address range of a different receive buffer. This eliminates the need to either substantially increase the number of receive buffers or frequently write explicit 'free receive buffer' commands to the bridge in order to maintain high performance.

In one embodiment, the bridge does not signal the second processor software that it has TLPs in the receive buffers since the QDR SRAM interface is master/slave and the bridge is the slave. Rather than polling to see if TLPs are present in the TLP header 258, a multi-DWord record corresponding to one TLP is read (or some number of complete records corresponding to the same number of TLPs) in a single read burst, and the header returned is marked invalid until one or more complete records (each of which is multiple DWords) are in the queue waiting to be read. This requires atomic-write and atomic-read. An example of atomic-write is that the FIFO must be seen as empty until the entire record has been placed in the FIFO. An example of atomic-read is that if the first read of a record returns an invalid header word, the second read of the same record must not return valid data (or pop anything off the FIFO) even if the full record became available between the first and second read.

Other embodiments are within the scope of the following claims.

What is claimed is:

1. A method, comprising:
communicating data between a first device and a processor over a path including the first device, an interface protocol device, a bridge mechanism and the processor, the bridge mechanism having a receive portion to receive incoming data having header data and payload data the receive portion including a receive buffer to store the payload data and a header module to store the header data, and a transmit portion with a transmit buffer; and
automatically freeing buffers in the receive buffer of the bridge mechanism after payload data in the buffers is read without explicit notification that a quantity of the payload data has been read.

2. A method, comprising:
communicating data between a first device and a processor over a path including the first device, an interface protocol device, a bridge mechanism and the processor, the bridge mechanism having a receive portion with a receive buffer and a transmit portion with a transmit buffer, and
automatically freeing buffers in the receive buffer of the bridge mechanism after data in the buffers is read without explicit notification that a quantity of the data has been read;
wherein automatically freeing buffers comprises automatically freeing a first buffer in the receive buffer upon a condition that a read address being within an address range of a different buffer in the receive buffers than the first buffer.

3. The method according to claim 1, wherein the bridge mechanism is a slave device to the processor, and further including performing an atomic read such that when a first read of a multi-word record in a receive queue returns a header word marked invalid, a subsequent read of the multi-word record does not return valid data if the record becomes available between the first and second reads.

4. The method according to claim 1, wherein the bridge mechanism is coupled to a memory port of the processor, and further including enabling a processing element in the processor to perform a write burst such that the write burst is not broken up between issuance and arrival on the memory port of the processor.

5. The method according to claim 1, wherein a read burst size matches a buffer size of buffers in the receive buffer.

6. The method according to claim 1, wherein the bridge mechanism is coupled to a memory port of the processor.

7. The method according to claim 1, wherein the processor is an Intel IXP network processor, and the bridge mechanism is coupled to a Quad Data Rate (QDR) Static Random Access Memory QDR SRAM port of the network processor.

8. The method according to claim 1, wherein the bridge mechanism provides a master-slave type interface over a slave-only interface.

9. The method according to claim 1, wherein the processor is a network processor.

10. The method according to claim 1, wherein the interface protocol is selected from the group consisting of PCI Express, PCI, and Advance Switching Interface, and Rapid 1O.

11. The method according to claim 1, wherein the first device is a general purpose processor.

12. The method according to claim 1, wherein the processor is an Intel IXP network processor, the first device is an Intel Architecture (IA) processor, and the protocol is PCI Express.

13. A device, comprising:
a bridge mechanism including
a transmit portion including:
a transmit buffer to store payload data;
a transmit header module to store header data;
a transmit input port to receive payload data from a processor for storage in the transmit buffer and to receive the header data from the processor for storage in the transmit header module; and
a transmit output port to transmit payload data from the transmit buffer and header data from the transmit header module to an interface device; and
a receive portion including:
a receive buffer to store payload data;
a receive header module to store header data
a receive input port to receive payload data from the interface device for storage in the receive buffer and to receive header data from the interface device for storage in the receive header modules; and
a receive output port to transmit payload data from the receive buffer and header data from the receive header module to the processor,
wherein buffers in the receive buffer of the bridge mechanism are automatically freed after payload data in the buffers is read without explicit notification of the data read.

14. The device according to claim 13, wherein the bridge mechanism is adapted to be a slave device to a processor.

15. The device according to claim 14, wherein the bridge mechanism is adapted to be coupled to a Quad Data Rate (QDR Static Random Access Memory (QDR SRAM) port of a network processor.

16. The device according to claim 13, wherein the bridge mechanism supports data transfer between the processor and a first device over the PCI express protocol.

17. The device according to claim 16, wherein the processor is an Intel IXP processor.

18. The device according to claim 13, wherein a size of buffer in the receive buffer matches a read burst size.

19. The device according to claim 13, wherein the bridge mechanism provides a bridge between a Quad Data Rate (QDR) Static Random Access Memory (QDR SRAM) port of an Intel IXP processor and a PCI Express interface at a Transport Layer Packets (TLP abstraction level.

20. A system, comprising:
a first device;
an interface device supporting a protocol coupled to the first processor;
a bridge mechanism coupled to the interface device, the bridge mechanism having a receive portion to receive incoming data having header data and payload data the receive portion including a received buffer to store the payload data and a header module to store the header data and a transmit portion with transmit buffers; and a processor having a memory port coupled to the bridge mechanism, wherein the bridge mechanism enables communication between the processor and the first device.

21. The system according to claim 20, wherein the processor is a Intel IXP network processor.

22. The system according to claim 20, wherein the protocol is the PCI Express protocol.

23. The system according to claim 20, wherein the memory port is a Quad Data Rate (QDR) Static Random Access Memory (QDR SRAM) memory port of a network processor.

24. The system according to claim 20, wherein the bridge mechanism Includes a first interface with the interface device and a second interface with a read data port of the processor, wherein buffers in the receive buffer are freed without explicit notification.

* * * * *